US012064788B2

(12) United States Patent
Dalziel

(10) Patent No.: US 12,064,788 B2
(45) Date of Patent: Aug. 20, 2024

(54) METHOD OF MANUFACTURING A CONTAMINATION CONTROL SHEET

(71) Applicant: DYCEM LIMITED, Bristol (GB)

(72) Inventor: Mark Dalziel, Bristol (GB)

(73) Assignee: DYCEM LIMITED, Bristol (GB)

( * ) Notice: Subject to any disclaimer, the term of this patent is extended or adjusted under 35 U.S.C. 154(b) by 276 days.

(21) Appl. No.: 17/594,674

(22) PCT Filed: May 20, 2019

(86) PCT No.: PCT/GB2019/051387
§ 371 (c)(1),
(2) Date: Oct. 26, 2021

(87) PCT Pub. No.: WO2020/234552
PCT Pub. Date: Nov. 26, 2020

(65) Prior Publication Data

US 2022/0212228 A1 Jul. 7, 2022

(51) Int. Cl.

| | |
|---|---|
| ***B05D 3/12*** | (2006.01) |
| ***B05D 3/00*** | (2006.01) |
| ***B05D 3/02*** | (2006.01) |
| ***B05D 7/04*** | (2006.01) |

(52) U.S. Cl.
CPC ............... *B05D 3/12* (2013.01); *B05D 3/007* (2013.01); *B05D 3/0254* (2013.01); *B05D 7/04* (2013.01)

(58) Field of Classification Search
None
See application file for complete search history.

(56) References Cited

U.S. PATENT DOCUMENTS 4,105,738 A * 8/1978 Rohn .................. B29C 44/5627 264/321
4,284,681 A 8/1981 Tidmarsh et al.
4,373,992 A * 2/1983 Bondoc ................ D21H 23/765 442/322
4,521,533 A 6/1985 Hamanaka et al.
(Continued)

FOREIGN PATENT DOCUMENTS

GB 1124472 A 8/1968
GB 1399191 A 6/1975
(Continued)

OTHER PUBLICATIONS

Search Report for International Application No. PCT/GB2019/051387 mailed Feb. 7, 2020.

*Primary Examiner* — Francisco W Tschen
(74) *Attorney, Agent, or Firm* — Pearne & Gordon LLP

(57) ABSTRACT

The present invention related to a method of manufacturing of a contamination control sheet, the method comprising the steps of: passing a web of support material from a supply roller to a coating station, and applying a coating of polymeric material to one surface of the support material; passing the coated support material through an oven to cure the polymeric material; and passing the coated support material around a cooling roller to a take up roller; characterised in that a nip roller is provided adjacent to the cooling roller so that the coated surface of the support material is pressed onto the cooling roller by the nip roller, and further characterised in that the cooling roller has a surface roughness of 0.2 to 1 Ra.

14 Claims, 1 Drawing Sheet

(56) References Cited

U.S. PATENT DOCUMENTS

2002/0125594 A1* 9/2002 Sung .................... C08J 9/103
264/40.1
2002/0153089 A1* 10/2002 Katsumoto .......... B32B 37/153
156/244.27
2009/0161214 A1* 6/2009 Nakai .................. B29C 48/919
528/370
2010/0207292 A1* 8/2010 Noritsune .............. B29C 48/08
264/211.11
2013/0230729 A1* 9/2013 Tian ..................... C08G 18/68
428/481
2017/0174935 A1* 6/2017 Gourdin .............. C09D 175/16
2018/0043598 A1* 2/2018 Ichinomiya .......... B29C 48/307
2019/0134961 A1* 5/2019 Stafyla .................. B65D 65/40

FOREIGN PATENT DOCUMENTS

GB 1475366 A 6/1977
GB 2025319 A 1/1980
GB 2144139 A 2/1985
WO 2006037977 A1 4/2006
WO 2006114599 A1 11/2006

* cited by examiner

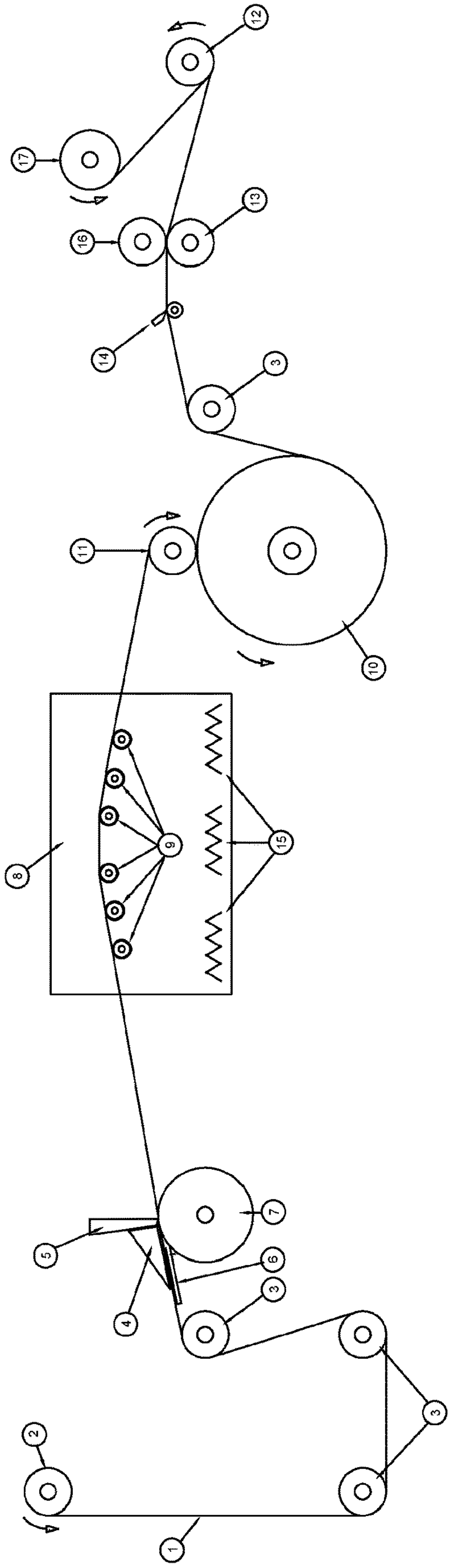
1
2
3
4
5
6
7
8
9
10
11
12
13
14
15
16
17

METHOD OF MANUFACTURING A CONTAMINATION CONTROL SHEET

FIELD OF INVENTION

The present invention relates to methods for making contamination control material.

BACKGROUND TO THE INVENTION

Maintaining a controlled environment is essential in many academic, industrial and medical settings, and controlling contamination entering that environment is very important. For example, many hospitals, factories, food preparation areas, spray-paint booths and laboratories utilise a controlled environment, which may be referred to as a cleanroom. Precautions are taken such as subjecting cleanroom staff to strict clothing regulations and using a gowning room where the staff can change clothes under "controlled" conditions so as to prevent any particulates from entering from the outside environment.

Contaminants are particles that enter an environment where they may potentially have a negative effect. There are many types of contaminants and they can have a wide variety of effects on different environments. Contaminants can be bacteria or other organisms that are potentially harmful to their surroundings. More familiar contaminants can be things such as dust and dirt. Contamination of a controlled environment poses a threat to product processes, the consequences of which are lower product yields, raised costs and decreased profits.

Studies have shown that contamination enters a controlled environment through entrances and exits, mostly at or near floor level. As a result of this, attempts have been made to reduce the contamination entering a controlled environment by using particular floor coverings. It is known to use particular floor coverings in entry and exit areas to controlled environments to attract, collect and retain foot and wheel borne contaminants, thereby reducing the contamination entering the controlled environment.

One type of flooring, known as polymeric matting, is particularly effective in certain situations in controlling particulate contamination. It is semi-permanently installed and can be cleaned as required. Dycem's® Protectamat flooring system is an example of this. The polymeric matting comprises a single layer of polymer, usually a specially blended polymer formulation comprising polyester plasticisers leading to a tack that can attract and bind contaminants.

The texture of the surface of the polymeric matting is very important in determining how effective it is for the purpose of contamination control. Methods for making contamination control polymeric matting have been disclosed by the applicant, such as in GB 2025319, WO 2006/114599 and U.S. Pat. No. 4,521,533.

The present invention aims to provide improved methods of manufacturing a contamination control sheet that has advantageous properties, in particular is very effective in providing contamination control.

SUMMARY OF THE INVENTION

According to a first aspect, the invention provides a method for the manufacture of a contamination control sheet, the method comprising the steps of:

passing a web of support material from a supply roller to a coating station, and applying a coating of polymeric material to one surface of the support material;

passing the coated support material through an oven to cure the polymeric material;

and passing the coated support material around a cooling roller to a take up roller; characterised in that a nip roller is provided adjacent to the cooling roller so that the coated surface of the support material is pressed onto the cooling roller by the nip roller, and further characterised in that the cooling roller has a surface roughness of 0.2 to 1 Ra.

The inventors have found that the surface characteristics of the contamination control sheet are very important in determining how well it is able to perform. In particular, it is desirable to have a very flat surface in order to minimise pockets in which contamination can be retained during cleaning of the sheet. In the method of the invention, a nip roller is provided to press the coated surface of the support material onto the cooling roller. The cooling roller is advantageously the next step in the process after the oven, so the coating will be still be warm. This means that the coating can be malleable enough to conform to the surface finish of the cooling roller. In the invention the cooling roller has a surface roughness of 0.2 to 1 Ra, which is very smooth for a cooling roller. By being pressed against the cooling roller when warm from the oven, the coating can itself conform to the cooling roller to be smoothed to a surface roughness of 0.2 to 1 Ra. As the cooling roller reduces the temperature of the coating it completes the curing of the coating, thus setting the smooth surface texture of the contamination control sheet.

Although a smooth surface is advantageous for performance of the contamination control sheet, for aesthetic reasons it is desirable that the surface finish is matt, rather than shiny. The inventors have found that a balance these factors can be achieved according to embodiments of the invention wherein the cooling roller has satin chrome surface finish with a roughness of 0.2 to 1 Ra.

BRIEF DESCRIPTION OF THE DRAWINGS

FIG. 1 is a schematic illustration of a method according to a preferred embodiment of the invention.

DESCRIPTION

The present invention relates to a method for the manufacture of a contamination control sheet. The contamination control sheet comprises a web of support material covered on one surface with a polymeric coating, which acts as a contamination control layer.

Contamination control sheets broadly of the type produced in the present invention are known in the art.

By web, we mean a length of support material. The support material is advantageously provided on a roller, so that it can be coated and cured in a reel to reel method according to the invention. The web of support material can be made of any material that can be coated, and that has appropriate properties for the envisaged use. Usually the support material is polymeric. In a preferred embodiment, the support material comprises a glass fibre reinforced polymer.

By glass fibre reinforced polymer, we are referring to a substrate comprising a polymer comprising glass fibres. Any glass fibre reinforced polymer layer can be used and suitable materials are known to the person skilled in the art. A polyamide substrate can be used in one embodiment, optionally with polyethylene terephthalate filaments of non-wovens. For example, the inventors have, surprisingly, found that the Sarlibase Lisse underflooring, manufactured by Forbo Group, can act as an excellent support layer in the contamination control mat of the invention. This is a flooring underlayer typically used for providing acoustic soundproofing.

Using a support material comprising a polymer reinforced with glass fibres provides multiple advantages. The rigidity of the support layer helps to prevent localised folding, crumpling or wrinkling of the mat in response to, for example, wheeled traffic.

Furthermore, the rigidity provided by the support layer helps to prevent localised depressions forming in the mat that could facilitate pooling of liquids. The rigidity of the sheet also allows the mats to be installed rapidly on uneven flooring without creating the potential for pooling. In addition, while the glass fibres provide rigidity, a support layer can be created that also has enough flexibility to allow the mat to be rolled up for storage.

The web of support material provides a support layer to the product, and is therefore usually relatively strong and durable, while not being too heavy. The thickness and density can depend on whether the product is designed to be permanently installed long term or be for shorter term use. The support material can range in thickness from 0.3 to 1 mm thick In one embodiment, the surface of the support material that is coated can be printed. This means that the sheet can convey a message to users, for example to guide users over the contamination control area. In this embodiment, the polymeric contamination control coating should be transparent or translucent, so that the printing can be seen through it.

The method of the invention comprises the steps of passing the web of support material from a supply roller to a coating station. When the support material passes through the coating station, a coating of polymeric material is applied to one surface of the support material, usually by spraying. The polymeric coating acts as a contamination control layer in the final product.

The polymeric material preferably comprises a blend of polymers and plasticisers. In a preferred embodiment, the polymer comprises polyvinyl chloride (PVC). A large proportion of the polymer (60 to 100% by weight of the polymer) can be PVC. In one embodiment the polymer consists of polyvinyl chloride (PVC). The polymeric material preferably also comprises a major proportion (preferably 50 to 70% by weight) plasticiser, which contributes to the high surface tack of polymeric control layer. The plasticiser can be a polyester plasticiser such as chain-stopped poly (polypropylene glycol adipate) or poly (1,3-butane diolazelate). The polymeric material can contain a minor amount, such 0.5 to 5% by weight, of a modifier of rheological properties, such as finely divided silica, and/or a minor amount, such as 1 to 10% by weight, a colouring material, such as a pigment. Suitable materials are known to those skilled in the art and are described in GB1399191, WO2006/114599, GB1475366 and GB2025319(A).

The polymeric material is usually in liquid form, such as a paste or plastisol, and so can be kept in a reservoir and then coated and/or sprayed onto a surface of the support material.

Such contamination control materials are known in the art and are used to protect controlled environments. They attract and retain contaminants by having a high surface tack. In other words, particulate contaminants such as dust, spores or bacteria will adhere to the polymeric contamination control layer due to its high surface tack. The high surface tack of the polymeric contamination control layer is provided by a high coefficient of friction, for example, the coefficient of friction may be at least 1.5μ or at least 2μ or at least 2.5μ. Preferably the coefficient of friction of the polymeric contamination control layer is about 3μ or about 3.5μ. The coefficient of friction may be the dynamic coefficient of friction. Methods for determining the coefficient of friction will be familiar to the skilled person and may be as described in BS EN 13893:2002.

In addition, the polymeric contamination control layer may comprise at least one antimicrobial agent to actively kill microbes that contact the mat. Where present the antimicrobial can be included at a level of between 0.05 and 5% by weight of the polymeric coating material. The antimicrobial agent may be silver nitrate.

The amount of polymeric material applied to the support material in the coating station will determine the thickness of the polymeric contamination control coating. Usually sufficient polymeric material is applied to result in a polymeric contamination control coating that is 0.5 to 5 mm thick, preferably 1 mm to 2 mm thick, but the coating can be thicker or thinner if required, or multiple coating stations can be used, or the support layer can be passed thought the coating station(s) multiple times.

The coated support material is then passed through an oven to cure the polymeric material. The curing temperature is determined to suit the polymeric material being applied and may for example be 150 to 250° C., preferably 190-200° C. for a polyvinyl chloride-based material.

After the oven, the coated support material passes around a cooling roller to a take up roller. Cooling rollers have been used in the past, but the significance of the effect that they can have on the contamination control sheet had not been realised. In the past it seems that the cooling roller was not the first roller that the coated support material contacted after the oven. In the present invention it is preferred that after the coated support material leaves the oven, the first roller it contacts is either the nip roller or the cooling roller. In a particularly preferred embodiment, after the coated support material leaves the oven it first passes over the nip roller, and then passes between the nip roller and the cooling roller. When this happens, the polymeric material will still be warm from the oven, and so more able to take on the surface characteristics of the cooling roller, than if the sheet had undergone other steps between the oven and the cooling roller.

In the present invention, a nip roller is provided adjacent to the cooling roller so that the coated surface of the support material is pressed onto the cooling roller by the nip roller. In methods previously disclosed, such as in GB2025319, the take up roller is frictionally driven by the cooling roller and rests against it on an inclined plane. In the present invention, a separate nip roller is provided which is more able to provide a constant pressure of the coated support material against the cooling roller. By nip roller, we mean a roller that is biased towards the cooling roller so that it presses the coated support material against the cooling roller. Preferably, it presses the coated support material against the roller with a force of 20 to 80 Newtons/mm, preferably 40 to 60 Newtons/mm, more preferably about 50 Newtons/mm.

The cooling roller is maintained at a temperature of 15 to 25° C., preferably about 20° C. The cooling roller is suitably sized to give the coated support material no less than 2 minutes of contact time on the roller to take on the surface properties of the cooling roller. Preferably the diameter of the cooling roller is at least 600 mm, preferably 600 to 1000 mm.

The inventors have surprisingly found that by varying the surface of the cooling roller, the surface of the resultant contamination control sheet can be varied, with advantageous results. In the particular, in the present invention, the cooling roller has a surface roughness of 0.2 to 1 Ra. As explained above, using a cooling roller with this very smooth surface can results in a contamination control sheet that also has a very smooth surface, in order to minimise pockets in which contamination can be retained during cleaning of the sheet. However, having a textured cooling roller results in a contamination control sheet that it matt, rather than shiny, which is often seen as advantageous from an aesthetic point of view. In preferred embodiments, the cooling roller has a surface roughness of 0.3 to 0.6 Ra, preferably about 0.4 Ra. Ra values are well known in the field and can be easily determined by the skilled person, for example using the techniques described in EN ISO 4287. In more detail, Ra is the arithmetic average of the absolute values of the roughness profile ordinates. The average roughness is the area between the roughness profile and its mean line, or the integral of the absolute value of the roughness profile height over the evaluation length. The surface roughness of the cooling roller can also be measured by a profilometer which measures the average height of microscopic peaks and valleys. In general and in this application, Ra is measured in microns (millionth of a metre) therefore 0.4 Ra means a "roughness" as defined above of 0.4 microns.

Usually, the contamination control sheet would consist of the layer of support material and the polymeric contamination control coating. However, it is possible to have further layers. At least one layer may be interposed between the support layer and the polymeric contamination control coating layer. An interposed layer may provide features such as further support or further contamination control properties. A bottom face of the support layer may also be coated with a further layer, for example an insulating layer, grip layer, adhesive layer or layer that further distinguishes the top of the mat from the bottom.

A preferred embodiment of the present invention will be now be described with reference to FIG. 1, in which a continuous web 1 of, for example, a glass fibre reinforced polymer, which is to form the support material, is continuously unwound from a supply roller 2. This passes around a series of idler rollers 3 until it reaches a coating station 4 where a polymeric material in paste or plastisol form which is to form the polymeric contamination control layer is applied to it. The polymeric material is in liquid form, and is poured from a reservoir onto the support material. This material is smoothed out to the desired thickness by a doctor blade 5 acting against a supporting plate 6 or the roller 7.

The support material with the coating of polymeric material is then passed through an oven 8. During its passage through the oven the web is supported by a series of support rollers 9 which are so arranged that the web follows a slightly convex path. This is to prevent creasing of the polymeric material as curing progresses. The oven is heated by gas burners 15 located beneath the web. This is important as the turbulence caused by any burners above the web would tend to disturb the layer of highly-fluid hot polymeric material. The polymeric material is cured in the oven and sets. The curing temperature is arranged to suit the polymeric material being applied and may for example be 190-200° C. for a polyvinyl chloride-based material.

After emerging from the oven, the web then passes around nip roller 11 and cooling roller 10. The edges of the strip are then trimmed to required width by blades 14. Tension for trimming operation is controlled by driven roller 13 and nip roller 16. The product is then taken up by driven roller 12. Protective interliner paper roll 17 is fed in between product layers. When roller 12 full, it is replaced with empty roll.

The invention claimed is:

1. A method of manufacturing of a contamination control sheet, the method comprising the steps of:

passing a web of support material from a supply roller to a coating station, and applying a coating of polymeric material to one surface of the support material;

passing the coated support material through an oven to cure the polymeric material; and passing the coated support material around a cooling roller to a take up roller;

characterised in that a nip roller is provided adjacent to the cooling roller so that the coated surface of the support material is pressed onto the cooling roller by the nip roller, and further characterised in that the cooling roller has a surface roughness of 0.2 to 1 microns Ra, and wherein the cooling roller is sized to give the coated support material no less than 2 minutes of contact time on the cooling roller.

2. The method according to claim 1, wherein the cooling roller has a surface roughness of 0.3 to 0.6 microns Ra.

3. The method according to claim 2, wherein the cooling roller has a surface roughness of about 0.4 microns Ra.

4. The method according to claim 1, wherein the support material comprises a glass fibre reinforced polymer.

5. The method according to claim 1, wherein after the coated support material leaves the oven, the first roller it contacts is either the nip roller or the cooling roller.

6. The method according to claim 5, wherein after the coated support material leaves the oven, the coated support material first passes over the nip roller, and then passes between the nip roller and the cooling roller.

7. The method according to claim 1, wherein the nip roller is biased against the cooling roller with a force of 20 to 80 Newtons/mm.

8. The method according to claim 7, wherein the nip roller is biased against the cooling roller with a force of 40 to 60 Newtons/mm.

9. The method according to claim 8, wherein the nip roller is biased against the cooling roller with a force of about 50 Newtons/mm.

10. The method according to claim 1, wherein the cooling roller is maintained at a temperature of 15 to 25° C.

11. The method according to claim 10, wherein the cooling roller is maintained at a temperature of about 20° C.

12. The method according to claim 1, wherein the cooling roller has a diameter of 600 to 1000 mm.

13. The method according to claim 12, wherein the cooling roller has a diameter of 700 to 900 mm.

14. The method according to claim 1, wherein the cooling roller is sized to give the coated support material 2-4 minutes contact time on the roller.

* * * * *